Jan. 31, 1928.

W. C. STEVENS 1,657,846

TIRE MAKING MACHINE

Filed Nov. 14, 1917        12 Sheets-Sheet 3

Jan. 31, 1928.  
W. C. STEVENS  
1,657,846  
TIRE MAKING MACHINE  
Filed Nov. 14, 1917  12 Sheets-Sheet 4

Witness  
Inventor  
William C. Stevens

Jan. 31, 1928.
W. C. STEVENS
1,657,846
TIRE MAKING MACHINE
Filed Nov. 14, 1917     12 Sheets-Sheet 5
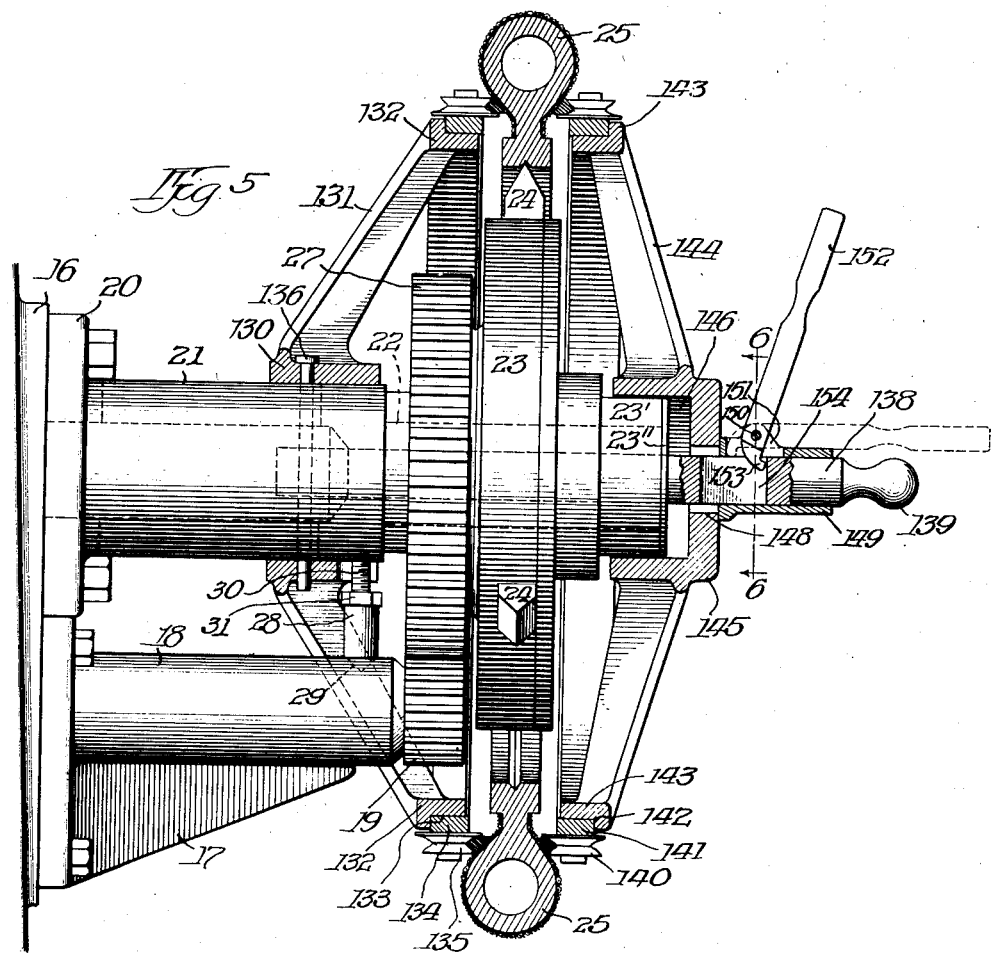
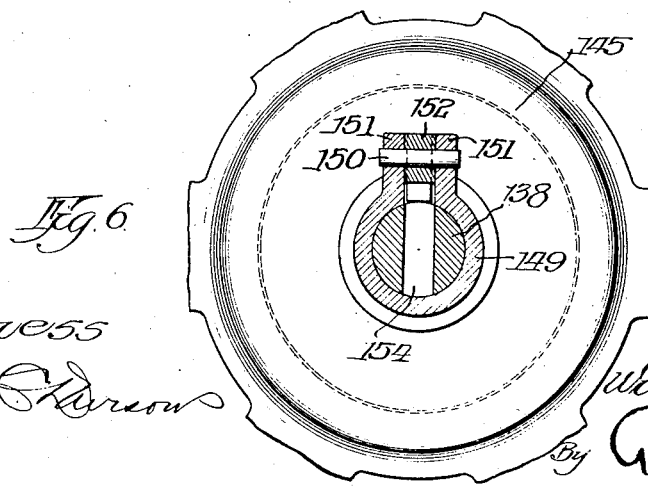

Jan. 31, 1928.  W. C. STEVENS  1,657,846
TIRE MAKING MACHINE
Filed Nov. 14, 1917     12 Sheets-Sheet 6
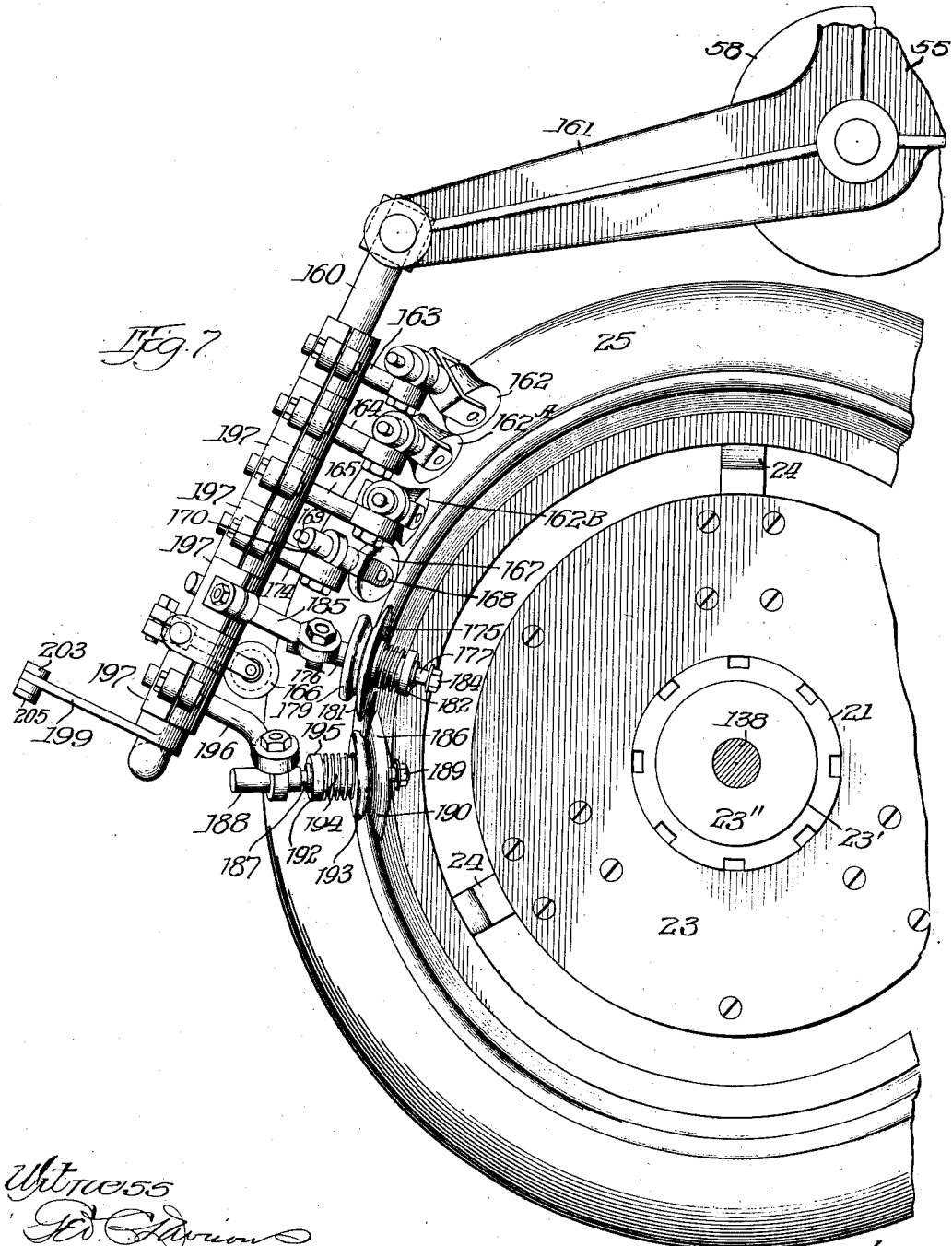

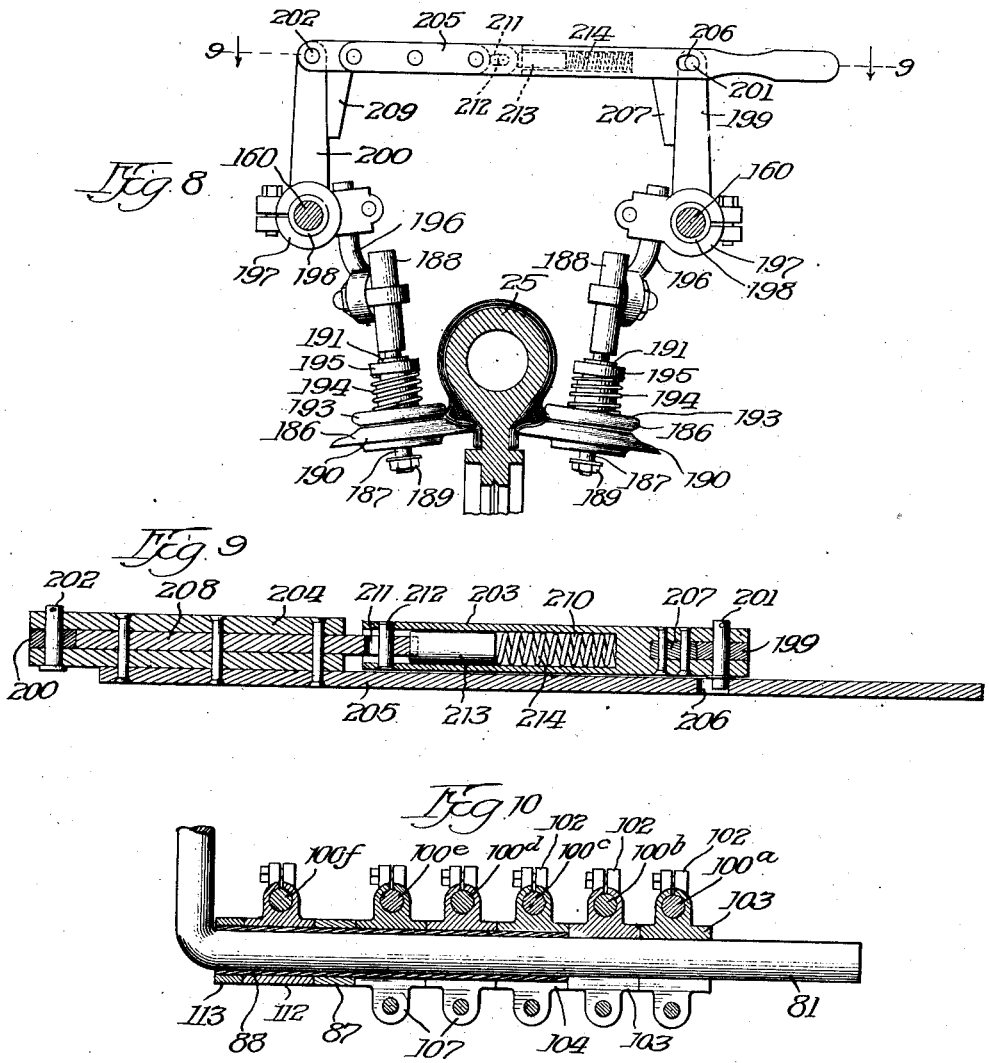

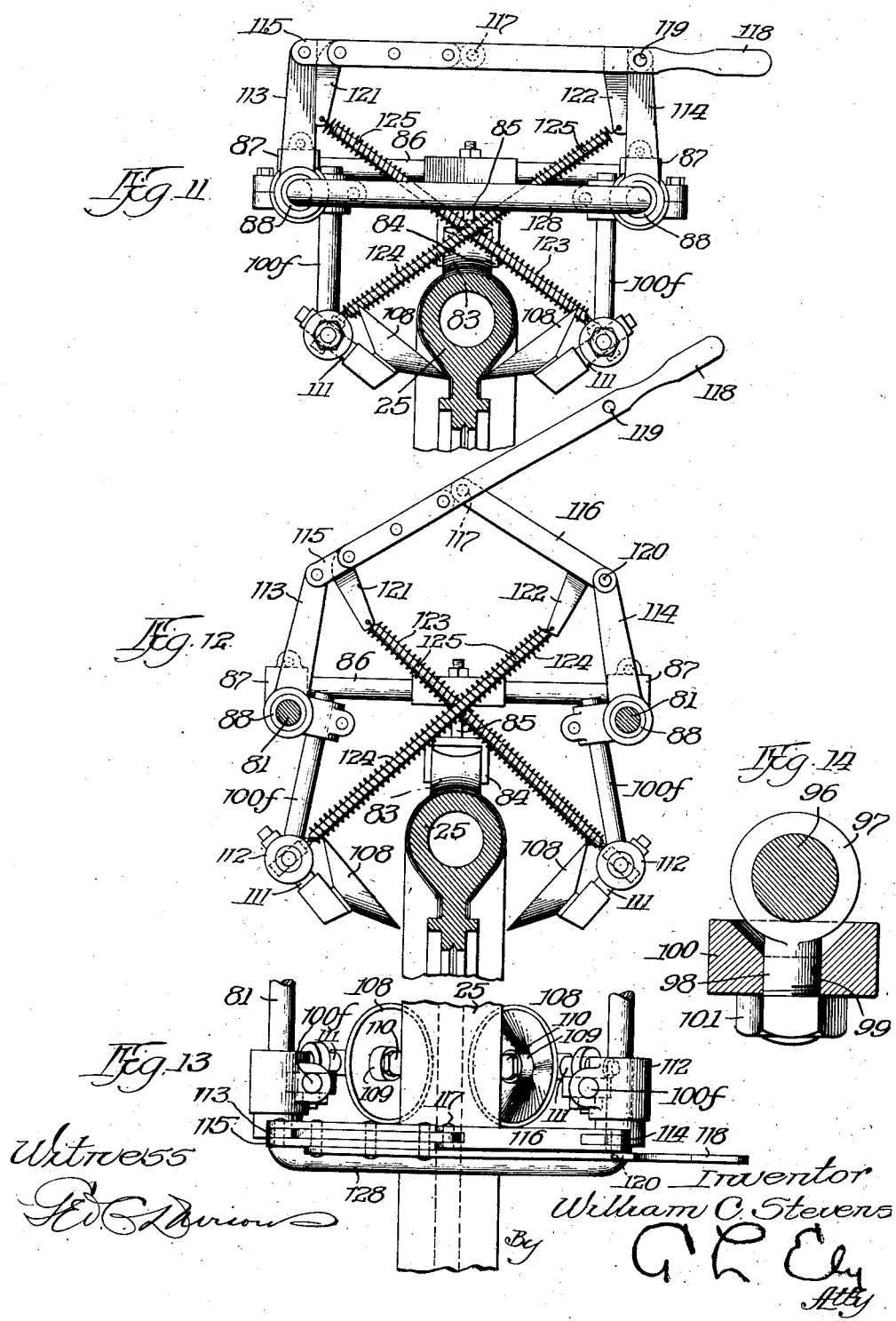

Jan. 31, 1928.
W. C. STEVENS
TIRE MAKING MACHINE
Filed Nov. 14, 1917
1,657,846
12 Sheets-Sheet 9
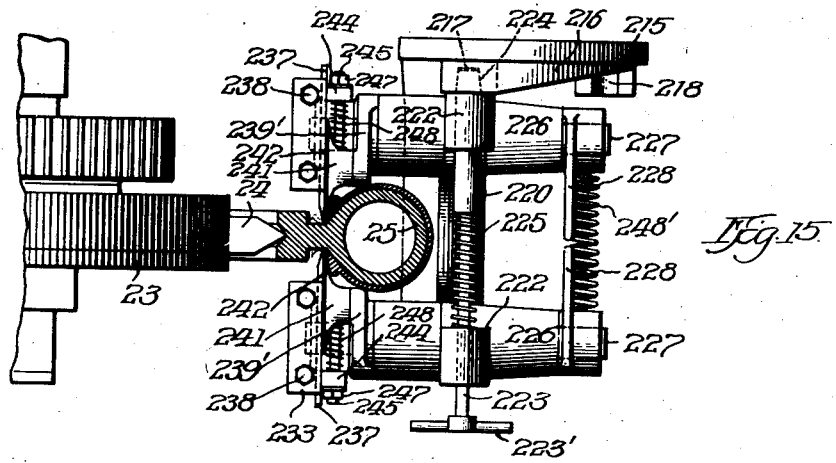
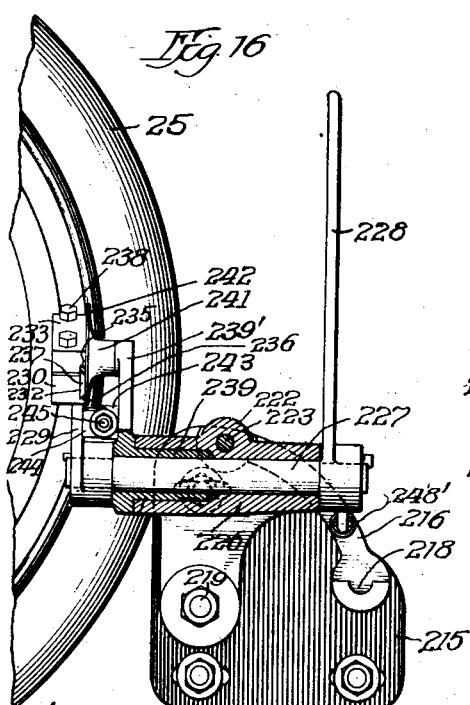
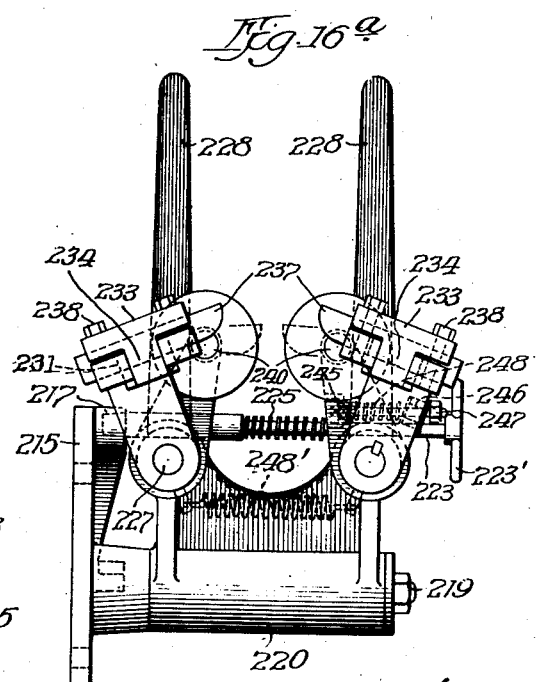

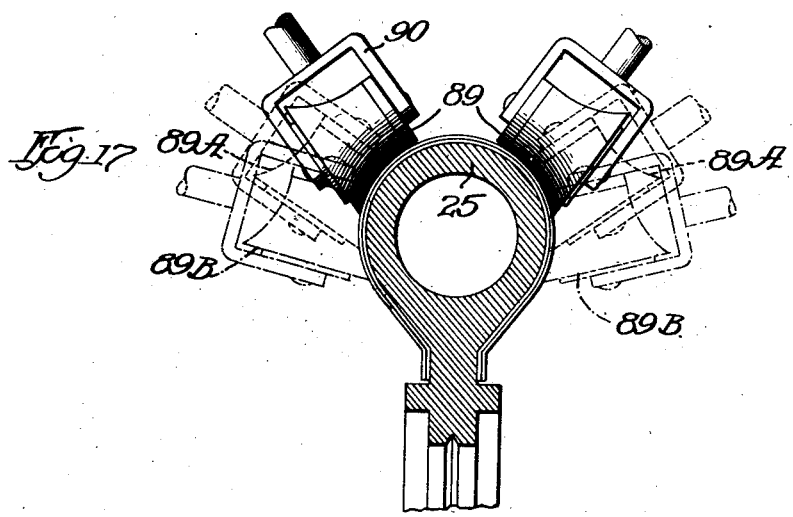
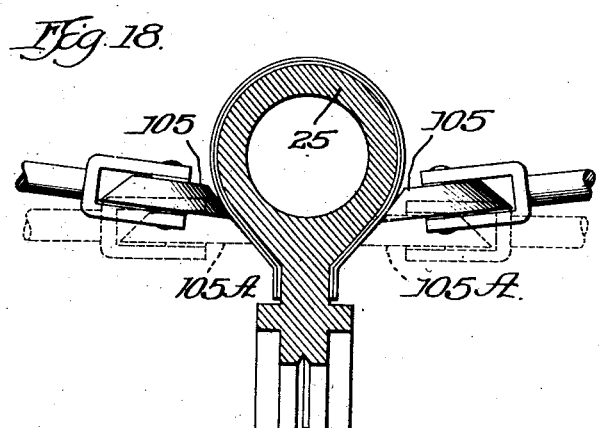
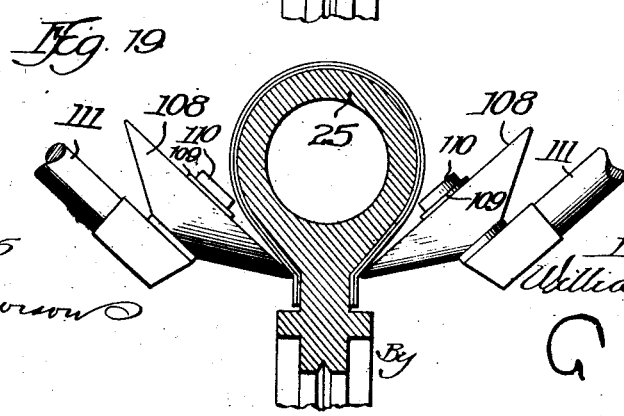

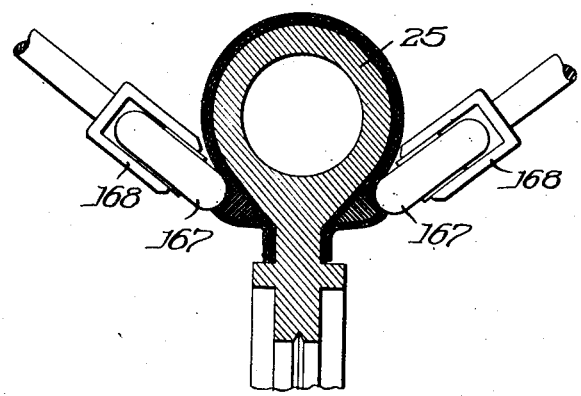
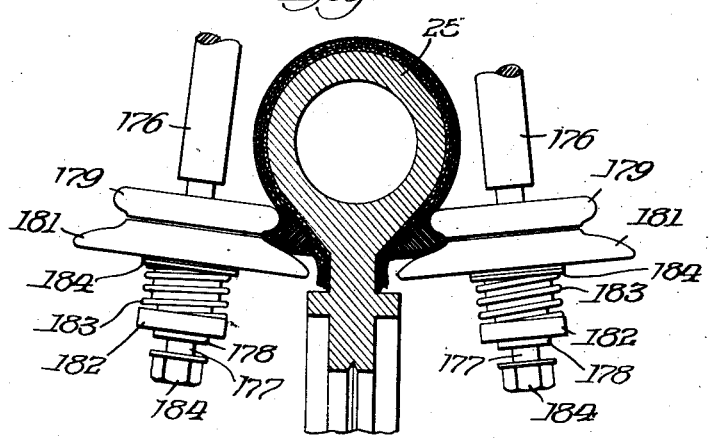
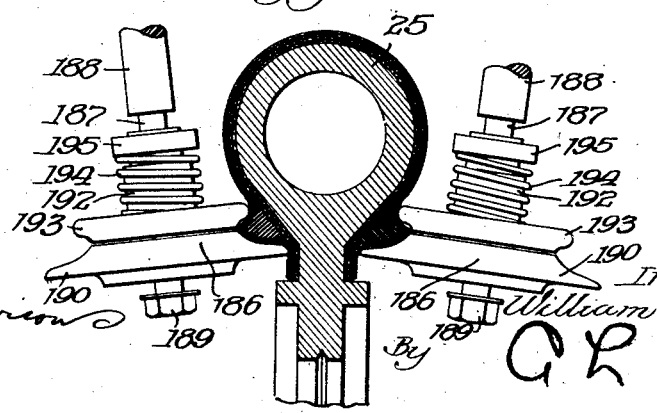

Jan. 31, 1928.
W. C. STEVENS
1,657,846
TIRE MAKING MACHINE
Filed Nov. 14, 1917    12 Sheets-Sheet 12
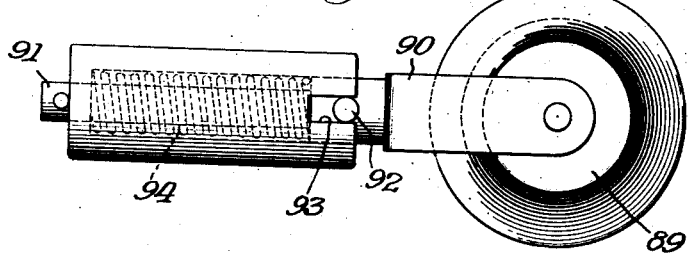
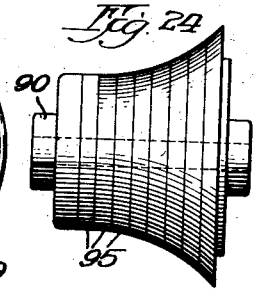
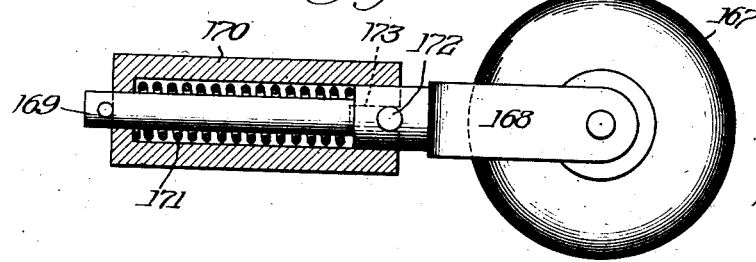
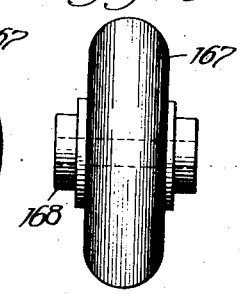
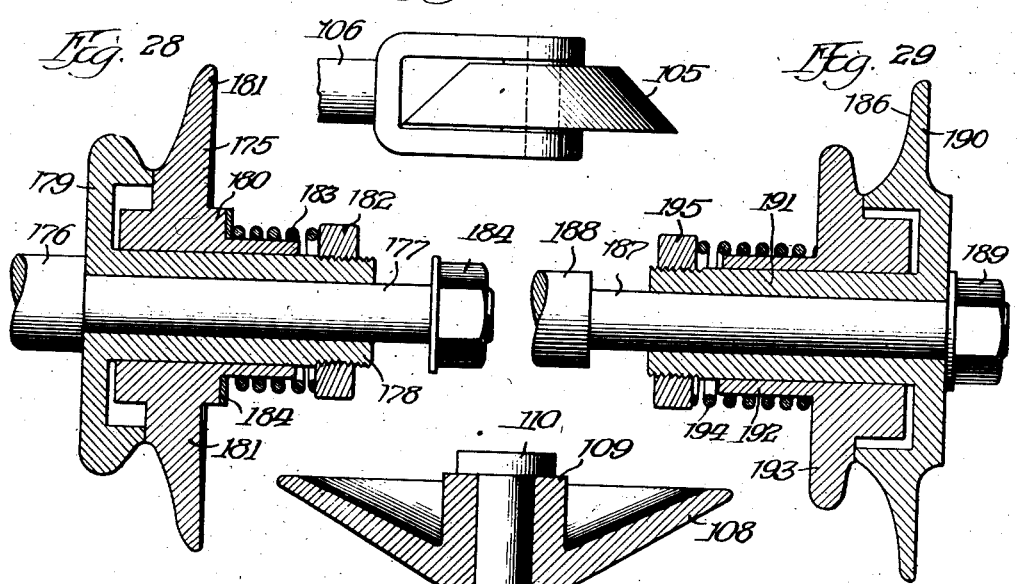

Patented Jan. 31, 1928.

1,657,846

UNITED STATES PATENT OFFICE.

WILLIAM C. STEVENS, OF SUMMIT, OHIO, ASSIGNOR TO THE FIRESTONE TIRE & RUBBER COMPANY, OF AKRON, OHIO, A CORPORATION OF OHIO.

TIRE-MAKING MACHINE.

Application filed November 14, 1917. Serial No. 201,967.

The object of my invention is to construct a machine which will make the carcass of pneumatic tires upon a core and will lay the fabric down over the core without wrinkling or scoring. It is also an object to produce a simple compact and efficient machine which will make the tires as rapidly as possible and which will require but one operator.

It has been the purpose of this machine to so combine and correlate the several instrumentalities essential to the formation of a tire, i. e. fabric supplying, fabric tensioning mechanism, a core and means to shape the fabric about the core, as to present a compact and efficient machine which requires a minimum of adjustments or hand operation. The machine is entirely automatic when the parts are brought to operative position and reduces the amount of hand operation, supervision and time required of the operator to a minimum. It has also been an object of this invention to construct a simple and efficient bead placing mechanism which accurately locates and firmly cements the bead in place in the carcass. A further object has been to construct a new type of trimming mechanism which insures a perfect trimming of the carcass without injury to the bead and without dulling the knife by contact with the core.

The various objects set forth above are obtained in the machine by the use of a simple and quickly available tensioning and forming mechanism for stretching, applying and shaping the fabric to the core; by the use of readily openable means for applying the two beads uniformly and in correct position on the carcass, and by the use of trimming mechanism for the edges of the carcass, which is efficient in operation and at the same time prevents possible injury to the beaded portion of the carcass.

In the several views there has been shown a specific embodiment of my invention, but it is obvious that changes in the details of the machine might be made without departing from the scope of the invention:

In the drawings accompanying this application are shown the following views of the machine forming this invention:

Fig. 5 is a cross section through the bead placing device showing the means used for forcing the bead holding mechanism in contact with the core.

Fig. 6 is a cross section on the line 6—6 of Fig. 5.

Fig. 7 is an enlarged elevation of the second set of applying tools; that is, the set adapted to apply layers of fabric after the bead is placed in position.

Fig. 8 is a cross section through the tool arm showing the last tool for working around the bead.

Fig. 9 is a sectional view in the line 9—9 of Fig. 8.

Fig. 10 is a longitudinal section through the tool carrying arm showing the manner of mounting the various tools on the shaft.

Fig. 11 is a front view of the tool carrying arm of the first set showing the last tool of the set in position.

Fig. 12 is the same set swung out from contact with the core and ready to lift.

Fig. 13 is a plan view of Fig. 11.

Fig. 14 is a detail of the tool holding device.

Fig. 15 is a cross section of the core showing the trimming knives in operative position.

Fig. 16 is a side elevation showing the trimming knives in cutting position and the bearing for the knife arm in section.

Figure 1:
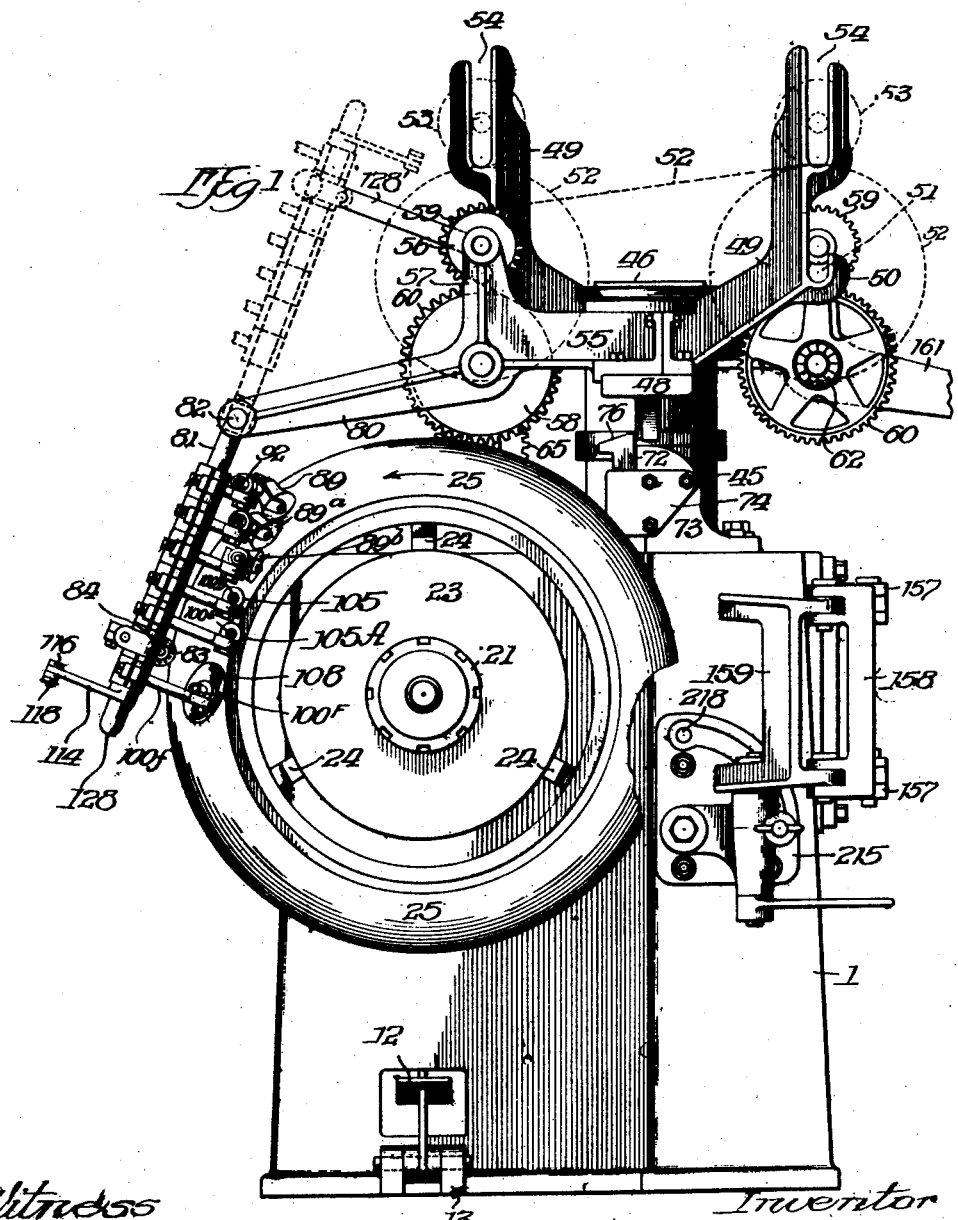
Fig. 1 is a side elevation of the machine showing in position the tools of the first set; that is, the tools adapted to lay the plies under the bead.
Figure 2:
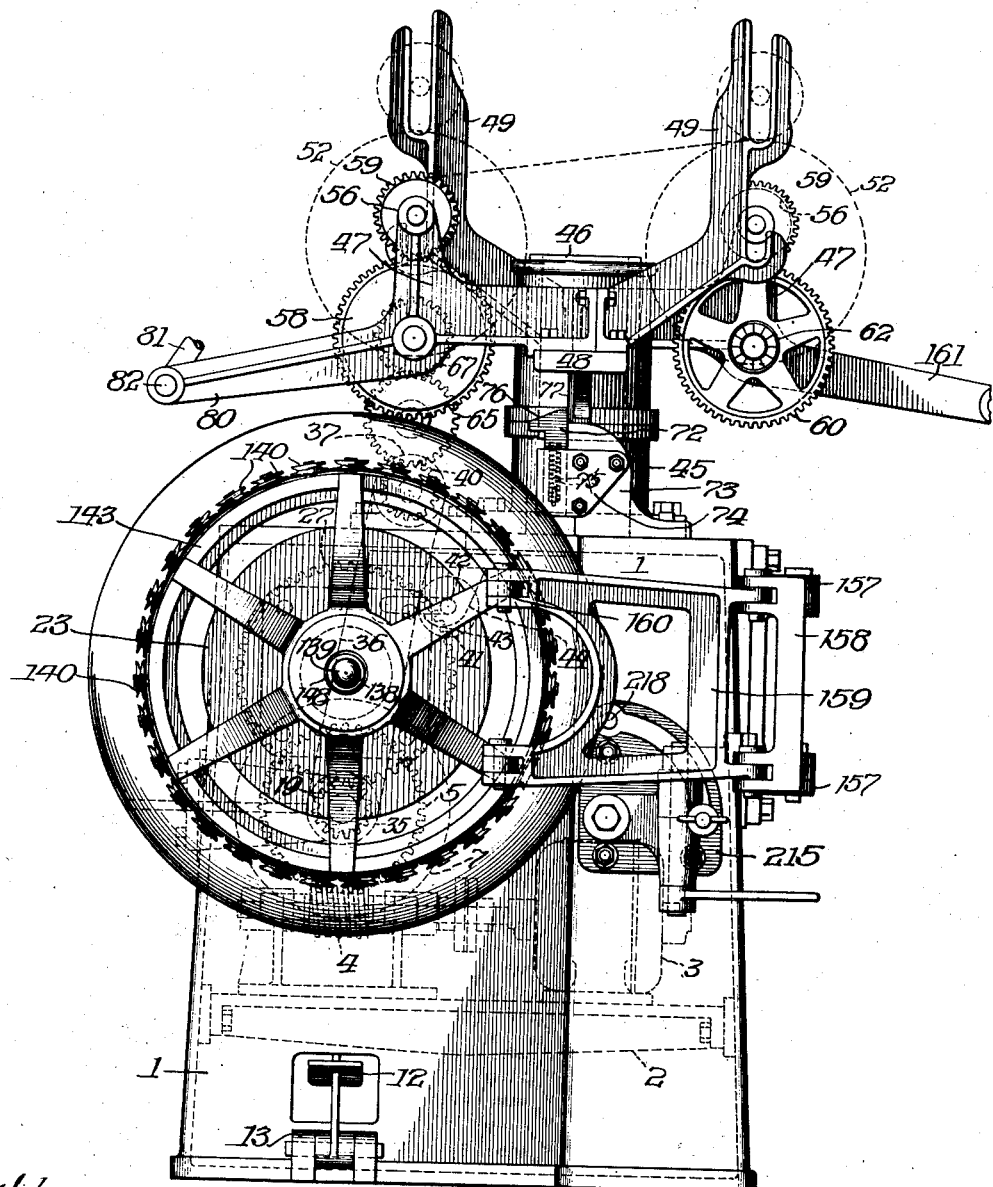
Fig. 2 is another side elevation, the bead placing apparatus being in position and the tools having been broken away.
Figure 3:
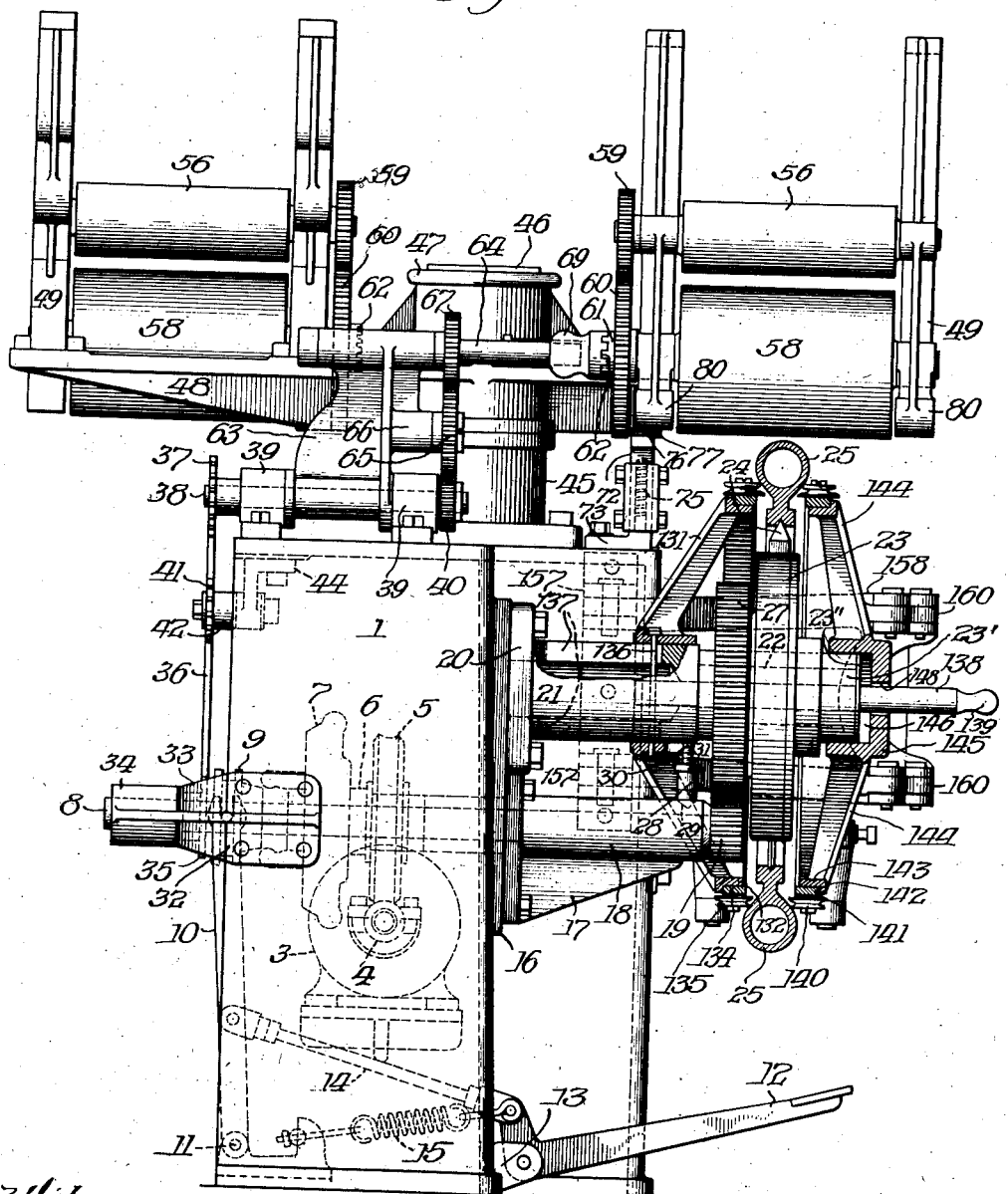
Fig. 3 is a front elevation of the machine in the position shown in Fig. 2, the bead placing apparatus being shown in section.
Figure 4:
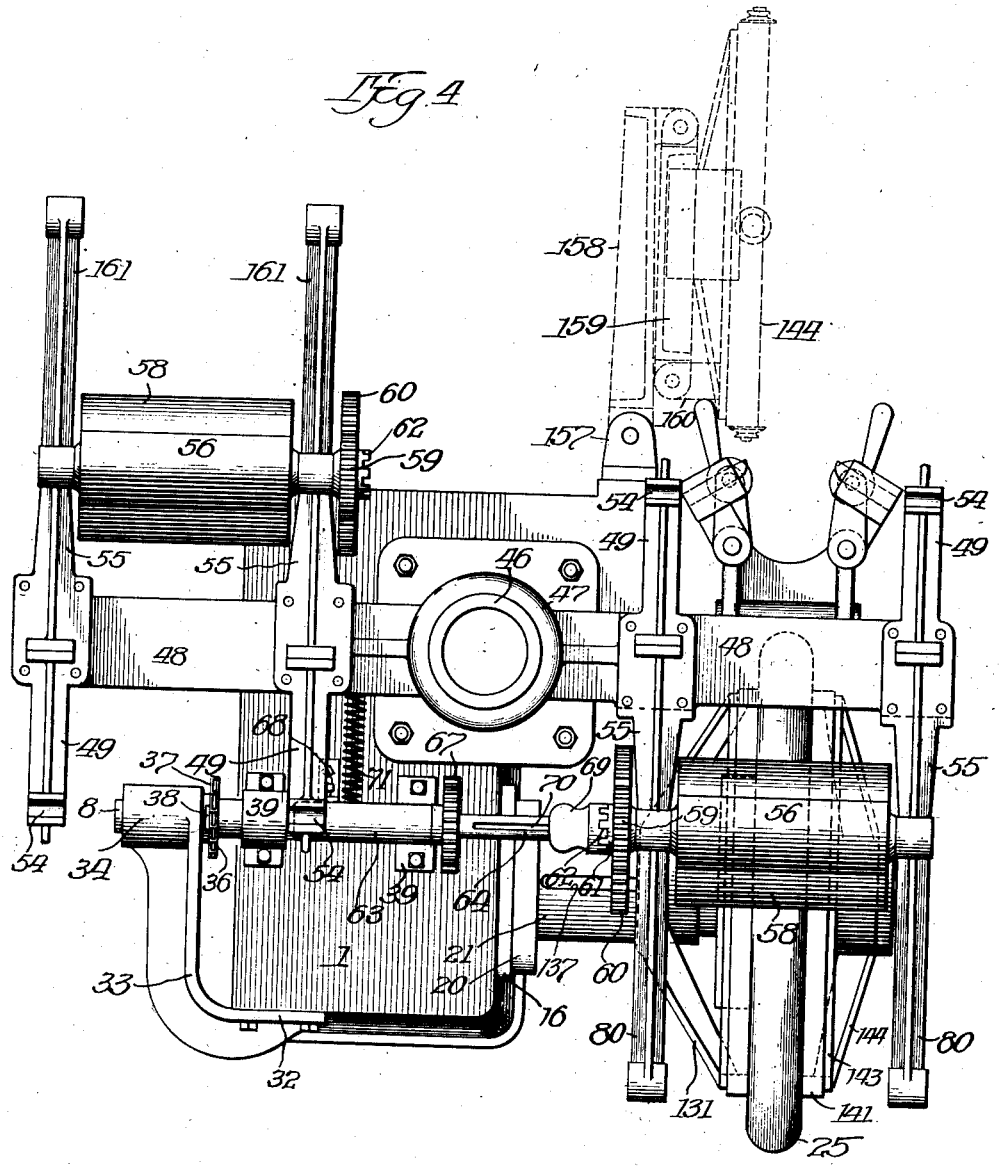
Fig. 4 is a plan view, certain parts having been omitted for the sake of clearness.

Fig. 16ª is a side view of the trimming mechanism.

Fig. 17 is a detail showing one pair of the first three pairs of forming rolls of both sets in full lines, the position of the other rolls being shown in dotted lines.

Fig. 18 is a view showing the two pairs of rolls of the first set which operate at the region under the bead.

Fig. 19 is a view showing the last pair of rollers of the first set.

Fig. 20 is the fourth pair of tools of the second set.

Fig. 21 is the fifth pair of tools of the second set.

Fig. 22 is the sixth pair of tools of the second set.

Figs. 23 and 24 are details of tool No. 1, 2 or 3 of either set.

Figs. 25 and 26 are details of the fourth tool of the second set.

Fig. 27 is a detail of the fourth and fifth tools of the first set.

Fig. 28 is a detail of the fifth tool of the second set.

Fig. 29 is a detail of the sixth tool of the second set.

Fig. 30 is a detail of the sixth tool of the first set.

The machine comprises several instrumentalities comprising a supporting standard and driving mechanism for a rotating core, fabric carrying and stretching mechanism, a set of shaping tools to act on the plies of fabric laid on the core before the bead is applied, bead applying mechanism, a second set of shaping tools to act on the plies over the bead, and a trimming apparatus, each mechanism being called into use to perform its function on the carcass, the combined action resulting in a tire of superior qualities and workmanship.

The machine comprises the various elements set out above and they will be described in the order named, and for this purpose the description will first have to do with the

Machine, frame and driving mechanism.

A hollow casting 1 forms the support for the elements of the machine and as a housing for the driving mechanism, the frame being generally rectangular in form but with a broader wing or extension at the rear to support the bead placing rings. On a bracket 2 on the inside of the frame is carried a motor 3, the same driving a worm shaft 4 in mesh with a worm gear 5 secured in the sleeve 6 of a clutch member 7 loosely mounted on a main drive shaft 8. A sliding clutch operating cone 9 is non-rotatively connected with the main shaft 8, being arranged to be moved along the shaft 8 to form a driving connection between the worm wheel 5 and the shaft by a lever 10 pivoted to the base of the machine at 11. A foot treadle 12 is pivoted to a bracket 13 on the front of the machine and is connected by a link 14 to the lever 10. A coil spring 15 is fastened to the foot lever 12 and the base of the machine in position to maintain the foot lever in raised position with the clutch disengaged.

The front face of the standard is provided in its upper half with a vertical surface 16 to the lower portion of which is secured a bracket 17 having a horizontal bore 18 to receive the drive shaft 8, the extremity of the drive shaft carrying a pinion 19 which serves to drive the core chuck. Above the bracket 17 is secured to the vertical surface a second bracket 20 integral with which is formed a tubular spindle or bearing sleeve 21 which is extended and reduced to form a bearing shaft 22 which carries the core chuck.

The core chuck, denoted generally by the numeral 23, having a hub 23' mounted on the end of shaft 22 and secured in place by a plate 23'' at the end of the shaft, is of any suitable type known in the art, or, preferably, of the form of quick acting chuck shown in Patent No. 1,256,841 granted to me Feb. 19, 1918. It comprises usually three expanding arms 24, which are so constructed as to be advanced or withdrawn simultaneously to receive and hold the tire form or core 25 centered with respect to the spindle 21. The arms are expanded or contracted by rotation of an internal cam member (not shown, but for complete description reference may be had to the above identified patent, the details being unnecessary to an understanding of this invention). The chuck carries a gear 27 which meshes with the drive pinion 19. In order to space the bore 18 and the spindle 21, use is made of a spacer or spreader composed of a tubular sleeve or thimble 28 cone shaped at its lower end as shown at 29 (Fig. 5) and seated in a correspondingly shaped recess in the top of the bore 18. An adjusting set screw 30 is received in the upper end of the thimble 29 around which is threaded a nut 31 which rests on the upper surface of the thimble. By use of the spreading means so provided it is possible to accurately space the two sleeves or bearings 18 and 21 and compensate for any tendency of the bearing 21 to sag under the weight of the heavy core and bead placing mechanisms.

At the side of the standard 1 directly behind the bracket 17 is secured another bracket 32 which is curved around at nearly right angles as at 33 to form a bearing sleeve 34 which receives the rearwardly projecting end of the shaft 8. On the shaft 8 between the bearing 34 and the rear face of the standard 1 is received a sprocket gear 35 over which travels a sprocket chain 36. The chain is received over a second sprocket wheel 37 secured to a shaft 38 mounted in bearings 39 on top of the standard, the end of the shaft carrying a pinion 40 which serves to operate the tension mechanism. The chain 36 passes in contact with an idler sprocket 41 mounted to rotate on a spindle 42 which is secured for adjustment in a slot 43 formed in a bracket 44 secured to the under side of the top of the standard. By means of this adjustment it is possible to take up looseness in the chain 36.

Fabric carrying and stretching mechanism.

In the manufacture of tires on this machine plies of rubber coated fabric are used cut on the bias, that is at an angle of 45° to the length of the fabric, of differing widths, the difference in width being for the purpose of compensating for the widths of fabric required to go around the tire at the different locations, as it is necessary to use a wider ply of fabric for the plies over the bead than for the plies under the bead. It is also required to stretch the fabric longitudinally as it is placed on the core in order to shape it to the form in which it is built. For this purpose there is utilized a plurality of fabric supply rolls for carrying fabric of different widths which is so contructed as to allow any of the supply rolls to be brought into operative position with respect to the tire form, and fabric tensioning means which co-operates with the supply roll being for the purpose of stretching the fabric as it passes to the core.

The fabric supplies are carried on a pillar 45 secured to the top of the standard 1, the upper extremity of which is reduced and finished to form a trunnion 46. A fabric carrying frame 47 is mounted on the pillar 45 about the trunnion and freely turns thereon. From the central portion of the frame extend oppositely positioned arms 48 which serve to carry the fabric roll supports. The fabric carrying arms are identical in construction except that one pair is adapted to contain fabric of a greater width than the other and for this reason one set of fabric carrying arms will be described only, it being understood that the description will apply to both sets. It is understood that although there has been shown but two sets of rolls the number may be increased if desired. At the outer end of each arm 48 is secured a pair of spaced angular arms 49 which extend backwardly and upwardly from the arm 48. At one side of the arms 49 is provided a pair of aligned recesses 50 in which is seated the shaft 51 of a roll of rubberized fabric 52. Between the convolutions of the rubberized fabric 52 is usually wound a layer of separating liner fabric which is taken off by a liner receiving roll 53 arranged to ride in a pair of vertical slots 54 in the upper end of the arm 49. Also secured to the arm 48 is a pair of horizontally extending arms 55 which align with the arms 49 and are secured thereto. The fabric 52 passes from the roll 51 to and around a rubber covered roller 56, which constitutes the first tension roller. Rotatably mounted in a pair of extensions 57 in the arms 55 below the rolls 56 is the second and final tension roller 58, which is directly above and closely adjacent to the surface of the core. A pinion 59 is secured to the shaft of the roller 56 meshing with a pinion 60 on the shaft of the roller 58 the two gears being so proportioned that the surface of the roller 58 moves slightly faster than the surface of the roller 56, whereby the fabric in passing from one to the other is stretched to a certain predetermined extent. The gear 60 is keyed to a sleeve 61 secured on the shaft of the roller 58, the outside face of the sleeve being formed with a clutch face 62.

Between the brackets 39 on the top of the standard and surrounding the shaft 38 is a rocker arm 63 in the upper end of which is rotatably mounted a shaft 64. Driving force to rotate the shaft 64 is obtained from the pinion 40 by an intermediate pinion 65 rotating in a short bearing 66 midway of the arm, and in mesh with a pinion 67 on the shaft 64, the pinion 67 being larger than the pinion 40. When the rocker arm 63 is in its upright position against the stop 68, the shaft 64 is in line with the shaft of the roller 58, and ends adjacent to the sleeve 61. A grab clutch 69 formed to mate with the clutch face 62 is rotatably secured to the shaft 64 but will slide along the shaft by reason of the key-way 70. A coil spring 71 is secured to the swinging frame 63 and the top of the machine and serves as a counter balance for the weight of the frame. The fabric carrying frame 47 is locked by a latch 72 in position with either one of the tension rollers 58 over the core. The latch 72 is mounted to reciprocate vertically on the face of a bracket 73 secured to the top of the machine under the arm 48 when in proper position. A V-shaped holder 74 is secured to the bracket and confines the shank of the latch, forming a housing for a spring 75 surrounding the latch and serving to maintain it in raised position. The upper surface of the latch is beveled off as shown at 76. A flat bearing surface 77 is formed in the arm 48 and rides against the latch. The table carrying the fabric may be swung around the front of the machine whereupon the bearing surface 77 will depress the latch and ride over it. In the application of the fabric to the core the rotation of the core in the direction of the arrow in Fig. 1 pulls the table around until the surface 77 rests against the rear of the latch and the table is locked in position. The rocking arm 63 is swung to vertical position and the grab clutch 69 is connected with the surface 62. The fabric 52, having been brought around the roller 56 and in the rear of the roller 58, is attached to the core. If the operator depresses the treadle 12 the clutch on the core shaft will be thrown into engagement and the core will be rotated. Fabric will be drawn by the core around the tension rollers, being shaped to the core by the tools or devices to be described. As the tension roller 56 rotates slower than the roller 58 and as this in turn rotates slower than the core by means of differential gearing located in the driving mechanism from the shaft 8 to the shaft 64, the fabric is pulled on the core more rapidly than it is "paid off" by tension rollers which gives it a longitudinal stretch over the crown of the core. In the tension drawing mechanism the differential speed is imparted by providing a smaller pinion at 40 than at 67, but it is obvious that it might be imparted by differentiating the gearing at any other point if desired.

Shaping fabric under the beads.

A core having been placed on the machine and secured by the chuck, the leading end of a fabric ply from the roll of narrower fabric is passed about the rollers 56 and 58 and attached to the core. The clutch is now thrown into driving relation which slowly turns the core and draws the fabric thereon under tension or elongating it in the central portion as has been described. In its passage around with the core the fabric immediately meets a set of forming rolls which shape it to the core. As has been explained there are two sets of forming rolls which are used, one under and one over the bead. The first set will now be described.

From the arms 55 which carry the tension rollers associated with the first or narrow ply of fabric, extend forwardly and slightly downwardly positioned arms 80. In the extremities of these arms is pivotally mounted a U-shaped swinging carrier or yoke 81 which serves to carry the various rollers or tools which shape the fabric. The ends of the arms are secured in rotary knuckles or holders 82 pivotally mounted at the ends of the arms 80. The weight of the swinging carrier or frame and the tools carried thereby is supported by a small concave roller 83 running on the crown of the core and rotatably mounted in a fork 84 the main stem 85 of which is secured to a cross bar 86 extending across the frame 81 and held at the ends in clamps 87. The clamps are loosely mounted on sleeves 88 surrounding each of the members of the swinging frame for purposes to be described. The act of applying the fabric under tension serves to shape it over the crown and down the sides a short distance. The first two members on each side of the core with which the fabric contacts are concave rollers shown in the various positions in Fig. 17, and in detail in Figs. 23 and 24. The shaft of each roller is held in a fork 90 provided with a stem 91. The stem 91 is reduced and slidably mounted in a barrel 91' a pin 92 on the stem cooperating with a slot 93 in the barrel to prevent turning of the tool carrier. A spring 94 in the barrel and surrounding the stem serves to yieldingly hold the roller outwardly. These rollers may be constructed of any suitable material, but are preferably made of layers of leather 95 as this has been found to work better than any other material. The position of each pair of these rollers around the core is indicated by the full and dotted lines in Fig. 17, the first pair of rollers being called 89, the second 89$^A$ and the third 89$^B$.

The method of securing each tool to its supporting arm is the same and will be described at this point, particular reference being had to Fig. 14. A tool stem or barrel is shown generally by the numeral 96 in this figure and it is passed through an eye 97 formed at the end of a bolt 98 passed through an opening 99 on the end of its tool arm shown generally by the numeral 100. A nut 101 on the end of the bolt may be tightened to draw the eye 97 inwardly whereby the tool stem 96 is pinched in the upper surface of the tool carrying arm 100. The tool carrying arms 100$^a$ and 100$^b$ (see Fig. 10) carrying the first two pairs of rollers are secured in clamps 102 formed on larger clamps 103 rigidly secured to the arms 81. The rollers 89$^B$ as shown in Fig. 17 pass below the equator or median line of the core and while 89 and 89$^A$ may be raised from the core directly the rollers 89$^B$ must be swung outwardly from the core before being raised. This purpose is attained by securing the tool carrying arm 100$^c$ of roller 89$^B$ by a clamp 102 to a clamping collar 104 which is secured to the sleeve 88 previously described as loose about the arm 81.

The next tools or instrumentalities with which the fabric contacts to lay it to the core are two pairs of cone shaped rollers 105 and 105$^A$ which are shown in their position on the core in Fig. 18 and in detail in Fig. 27. The stem 106 of each roller 105 or 105$^A$ is spring held in the same manner as the stems 91 of the rollers 89 and are secured in the same manner to tool carrying arms 100$^d$ and 100$^e$ mounted in clamps 107 secured to the sleeve 88.

The last pair of tools to operate on the core are two cup shaped rollers 108 which operate at the lowest part of the core and give the last smoothing to the skirts of the fabric. This tool is shown in relation to the core in Fig. 19 and in detail in Fig. 30. It comprises a dished or hollowed cone construction the center of which is formed with a hub 109 rotatably mounted on a pin 110 screwed into the end of a stem 111, which is secured in the manner of the other tools to a tool carrying arm 100$^f$ secured to a clamp 112 loosely mounted on the sleeve 88.

In order to force the rollers 89$^B$, 105 and 105$^A$ in toward the core use is made of a pair of arms 113 and 114, which are secured to the ends of the sleeves 88 and extend upwardly parallel when the various tool carrying arms are in their operative position, shown in Fig. 11. To the upper end of the arm 113 is pivoted a link 115 and to the upper end of arm 114 is pivoted a second link 116, the two links being connected in a toggle arrangement by a pin 117. To the link 115 is secured a lever 118 which serves as a handle and has a slight spring so that the hole 119 in the end of the lever may pass over the protruding end of the pin 120 at the junction of arms 116 and 114 whereupon the tools will be locked in their operative positions. Depending at right angles from the links 115 and 116 are similar fingers 121 and 122 each finger lying against its respective link 113 and 114 when the arm 118 is locked in position as shown in Fig. 11. A long coil spring 123 extends from the end of finger 121 over to and is connected with the opposite shaping tool 108 near the terminus of the arm 100$^f$. A similar coil spring 124 extends from the finger 122 to the other tool. Seated in each spring 123 and 124 is a push rod 125, the lower end of which is secured in place by having the last convolution of the spring pass through the lower end of the rod. These push rods are slightly shorter than the distance from the end of the respective fingers to the point of attachment at the tool 108 so that when in position to operate on the tire the rollers 108 are held against the core by the springs and are free to move in and out to accommodate the building up of the fabric in winding about the core and the additional thickness caused at the time the ends of ply overlap.

The operation of the swinging frame will now be described. After the turn table carrying the fabric is brought into position and the leading end of the fabric is attached to the core, before the core is started to revolve the swinging frame 81 with the first set of operating tools is brought down from the position shown in dotted lines in Fig. 1 to the position shown in full lines with the roller 83 on top of the core. The rollers 89 and 89$^A$ resting on the top of the core or above the median line will pass into position without any swinging movement. The remaining rollers, however, are located below the median line, or widest point in the tire and for this reason must be swung or moved laterally before being moved onto or off the tire. For this purpose the tools are moved laterally by the rotary sleeve 88 shown in Fig. 10 and the push rods 125 shown in Fig. 11. The purpose of the push rods will be understood as the description proceeds as it is necessary to give the dished or cup shaped rollers of the first set of tools a greater swing than the remainder as they occupy a position further inwardly of the core than the other tools, as will be readily understood.

Preliminary to raising or lowering the swinging frame 81, the handle 118 is pulled away slightly to disengage the pin 120 from the hole 119. The lever 118 is then raised to the position shown in Fig. 12. The bending of the toggle joint between the arms 115 and 116 serves to rock the levers 113 and 114 inwardly slowly and as these levers are secured to the sleeves 88 the several arms carrying the tools 89$^B$, 105 and 105$^A$ also secured to the sleeve will rock outwardly away from the core. Before these arms have moved to an appreciable extent, however, the ends of the fingers 121 and 122 have struck the ends of the push rods 125 and the arm 100$^f$ carrying the rollers 108 are swung out rapidly and clear the core in the manner shown in Fig. 12. The frame 81 may now be swung towards or from the core, the operator grasping the transverse end 128 of the swinging frame 81 for this purpose, the swinging frame being in the position shown in dotted lines in Fig. 1, resting on the stop 128'. The various tools when in inoperative or raised position may be closed by bringing the lever 118 into horizontal position.

With the tools in the position shown in Fig. 1 the core with the leading end of the fabric attached at any point is revolved slowly which draws the fabric through the tension or stretching rolls and directly into the path of the several tools which shape and smooth the fabric to the core. The rotation of the core is continued until as many plies of fabric have been wrapped around the core as are necessary for application under the bead. The rotation is then stopped and the fabric is cut at about the point it contacts the core. After cutting, a partial rotation will complete the application of the ply.

The tire carcass is now ready for the application of the bead which is performed by a bead placing mechanism associated with the core. This comprises two rings or frames which carry an annular series of rollers adapted to carry and locate the beads which are furnished in endless rings of the proper size to be located in the tire. On the sleeve or arm 21 there is slidably mounted the hub 130 of one bead placing spider 131, the arms of which are joined together by a ring 132 having formed in its outer edge a seat 133 in which is seated a ring 134. Mounted in the ring 134 is a series of freely rotatable rollers 135, the profile of each of which conforms to the outer surfaces of the bead. In the form here shown the bead rollers are so shaped as to hold a clincher bead, but it is obvious that they may be shaped to carry a straight side bead as well. Extending across the hub 130 is a pin 136 the spindle 21 being slotted at diametrically opposite points as shown at 137 to allow the hub to slide back and forth on the shaft 21. A pull bar 138 is arranged to slide in the end of the shaft 21 being secured to the pin 136 at the inner end and provided with a handle 139 at its outer end. The rollers 135 carry the bead for the side of the core toward the machine. The other bead is carried by a second annular series of rollers 140 carried by a ring 141 seated in a rabbet 142 on the outer face of the rim 143 of a spider 144. The hub 145 of the spider is recessed as at 146 to have an accurate sliding fit over the protruding end of the chuck hub 23'. To press the beads in place, it being understood that the bead in the inner ring is put in position on the rollers 135 before the core is mounted on the chuck, and after the swinging frame 81 is moved out of the way, the operator pulls on the end of the rod 138 until the bead is placed against the tire carcass. He then brings the spider in place by means of a swinging frame, to be described, until the hub 145 is placed over the end of the chuck hub, a hole 148 being formed in the center of the hub to allow the pull bar to pass through. The two spiders being in the position shown in Fig. 5, a removable sleeve or thimble 149 is slipped over the end of the pull bar and against the face of the hub 145. At one side of the sleeve 145 is secured a pin fastened in lugs or ears 151 on the sleeve. A lever 152 is pivoted on the pin 150 and is provided with a short hammer-like end 153, which is adapted to pass into a slot 154 in the pull bar and bear against the rear of the slot when in raised position as shown in full lines in Fig. 5. When slipped over the bar the lever occupies the position shown in lotted lines, but upon rocking the lever the end 153 bears against the rear of the slot and upon pressure being applied to the handle the two bead carrying frames will be drawn toward one another. With the bead pressed tightly against the carcass the core is rotated slightly which rolls the bead firmly in place. The pressure on the lever is released, the sleeve or thimble is removed, whereupon the spider 131 may be moved back away from the core and the spider 144 is swung out of place.

The spider 144 carrying the outer bead placing ring is carried by a swinging frame by which it can be moved out of the way during the manufacture of the tire. A pair of aligned lugs 157 are carried on the back of the standard 1 and on the lugs are swingingly mounted the first member of the bead carrier frame which is a generally rectangular shaped frame 158. To the free extremity of this frame is pivotally mounted a second rectangular frame 159. Two lugs 160 are formed on the spider 144 and by means of these lugs the spider is pivotally mounted on the end of the second movable frame 159. The swinging frame construction forms a simple and convenient arrangement for bringing the bead into position on the carcass, and constitutes a ready means for placing the bead carrier out of the way when not in use. The bead carrying frames or spiders and the swinging frames may be made of aluminum for the sake of lightness and ease in handling. The hubs of the two carriers serve as an accurate means for centering the beads relative to the core and the rotation of the core while the several rollers 135 and 140 are held stationary, firmly cementing the bead in its place on the core.

*Shaping the fabric over the beads.*

There has been described a turntable, by means of which it is possible to carry two different widths of fabric to compensate for the increasing width of ply which is required according to the location of the ply on the core under or over the bead. After the beads are applied and rolled into place the operator draws back the clutch 69, lowers the rocking arm 63 and turns the fabric carrying frame until the surface 77 under the next width of fabric passes over the latch. The rocking arm is then brought back to vertical position and the grab clutch 69 thrown into engagement with the clutch surface 62 on the tension roller 58 for the wider ply. The end of the wider fabric is now attached to the core and the machine is ready for laying the plies over the bead.

The operation of laying the fabric over the bead requires a different set of rollers or tools which tools are carried on a swinging frame or yoke 160 similar to the frame 81 pivotally carried on the end of the arms 161 forwardly and downwardly extending from the part 55 carrying the tension rolls for the wider fabric.

The first three pairs of rollers or tools of the second set of tools are designated by the numerals 162, 162$^A$ and 162$^B$ and are identical with the rollers 89, 89$^A$ and 89$^B$ of the first set being secured on the swinging frame 160 in the same way that the other rollers are carried by the first frame; that is, the arms 163 and 164 carrying the rollers 162 and 162$^A$ are rigid with the frame, while the arms 165 carrying the roller 162$^B$ may be moved by a rotary sleeve 198, Fig. 8, similar to the rotary sleeve 88, Fig. 10. A supporting roller 166 adapted to ride on the crown of the core and carry the frame 160 is secured to the frame in the same manner as the roller 83 is secured to the frame 81.

The rollers 162, 162$^A$, and 162$^B$ shape and smooth the fabric immediately after it leaves the tension roller down to the region at the top of the bead. To roll or smooth the fabric into the curved surface on the top of the bead use is made of a roller 167, the position of which roller on the carcass is shown in Fig. 20 and in detail in Figs. 25 and 26. This roller is rounded off to fit the curve taken by the fabric in going over the top of the bead. It is mounted in the forks 168 on the end of a plunger 169 mounted in a barrel 170, a spring 171 being provided to allow the roller to give over splices in the fabric and as the tire builds up on the core. A pin 172 working in a slot 173 prevents the plunger 169 from turning. The roller 167 constituting the fourth tool of the second set is carried by an arm 174 secured to the same sleeve which carries the roller 162ᴮ and adapted to rock with it.

The next tool or roller which contacts the fabric is the roller adapted to lay the fabric around the heel of the bead, this roller being in two parts and designated as an entity by the numeral 175 shown in detail in Figs. 21 and 28. The stem or axis 176 of this roller is reduced as at 177 and on this portion is mounted sleeve 178 the inner end of which is formed with a flange 179 the outer surface of which is rounded to conform to the portion of the bead immediately back of the heel forming the half of the bipartite roller. Slidingly mounted on the sleeve 178 is the hub 180 of other half of the roller, the central portion of which is enlarged as at 181 and is conformed to outer half of the under side of the bead. A collar 182 is screwed on to the extremity of the sleeve 178 and a spring 183 abuts the collar at one end and a washer 184 fitting against the hub of the section 181. By the spring 183 the two parts of the roller are held together but are allowed to separate as shown in Fig. 21 as the thickness of the plies increases. A nut 184 holds the roller 175 in place. The stem or axis 176 is held by an arm 185 mounted to rock with the arms 174 and 165.

The sixth and last tool on a side of the core is adapted to give the fabric a final smoothing on the entire under side of the bead and is in the form of a two part roller 186, mounted on the reduced end 187 of a stem or axis 188. A nut 189 serves to hold the roller on the stem. The half 190 of the roller is formed to cover and wipe down the whole under surface of the bead and is formed with a sleeve 191 slidingly mounted on the stem 187. Loosely mounted on the sleeve 191 is the elongated hub 192 of the second half 193 of the roller 186, the said half being shaped to conform to the heel of the bead. A coil spring 194 about the hub 192 and resting at one end against the main portion of the roller and at the other against a screw collar 195, keeps the two parts of the roller together but allows them to separate to accommodate the increasing thickness of the fabric. The stem 188 is secured to a tool carrying arm 196 which is mounted to rock with the arms 165, 174 and 185.

Each one of these rocking arms is carried by a split clamping ring 197 which is secured on the sleeve 198 surrounding the longitudinal members of the tool carrying frame 160 in manner similar to sleeve 88. To the sleeves 198 are secured parallel upright rocking levers 199 and 200 to which are pivoted by pins 201 and 202, respectively, links 203 and 204. An operating handle 205 is secured to the link 204 and when the tools are in position is parallel to the link 203 being provided with a slot 206 adapted to take over the protruding end of the pin 201. A finger 207 is carried by the link 203 and lies along the lever 199, when the tools are in position. A bar 208 lies within the link 204 and has a depending finger 209 which lies along the lever 200 in manner similar to finger 207. The link 203 is bored as at 210 the bar 208 extending into said bored portion and provided with a slot 211 received over a pin 212 forming a toggle connection between the two links by which, upon operation of the handle 205, after freeing from engagement with the pin 201, the swinging arms carrying the last four pairs of tools may be operated to separate the tools from the core so that the swinging frame 160 may be positioned. A dog or plug 213 backed up by a spring 214 in the cavity 210 bears against the end of the bar 208 and this, in conjunction with the slot 211, constitutes resilient means for holding the several tool carrying arms in place and allowing them to give outwardly slightly as the tire carcass builds up.

After the leading end of the fabric has been stuck to the core and the swinging frame 160 brought into the position shown in Fig. 7 the several rollers being moved around the sides of the core by manipulation of the lever 205, the core is revolved slowly until sufficient fabric has been placed thereon to complete the carcass. This may require two or more revolutions to complete a tire. When the proper number of plies has been placed on the carcass the machine is stopped, the end of the ply is cut and the severed end rolled into place.

The bead rollers described have been for the manufacture of clincher tires, but it is obvious that by changing the shape of the rollers 135 and 140 and the bead applying tools that a straight side tire could be made.

*Trimming.*

The carcass is now ready for trimming, which is done by cutting off the edges of the fabric at the toe of the bead. To perform this act on the tire I provide a swinging frame which may be brought into operative position so that guide rollers carried thereby are pressed on to the beads and knives advanced into the fabric at the base of the beads.

The trimming mechanism is carried on a bracket or plate 215 which is adjustably secured to the face of the standard 1 at one side of and below the center of the core. An inclined rib 216 in the form of a quarter circle is formed on the plate 215, being provided at its upper end with a recess 217 and at its lower extremity with a recess 218 which are intended to form stops for the swinging knife frame to be described. From the front of the bracket extends a shaft or pin 219 which serves as a pivot for the swinging knife frame designated by the numeral 220. The two horns or extremities of the brackets are formed with aligned openings 222 through which is passed a locking pin 223, the outer end of which is formed with a handle 223' and the inner end is tapered as at 224 to enter the recess 217 and lock the frame in the position shown in Figs. 15 and 16 for trimming purposes, or rest in recess 218 when the knife frame is thrown back. A coil spring 225 located around the pin 223 and resting against one horn of the frame and a shoulder on the pin, serves to force it inwardly into locking position. Each horn of the swinging knife carrying frame 220 is formed with a longitudinal bearing 226 in which is rotatably mounted a shaft 227, the outer end being provided with an operating handle 228. These two operating handles are arranged to be pulled together by the operator to force the knives in toward the core for the trimming. On the end of the shaft 227 on the other side of the bracket 226 from the handle is keyed a knife arm 229, the upper end of which is formed with a T-shaped head 230 in the front face of which is a dovetailed guideway. On the rear face of the knife arm is formed one section of a dovetailed guideway 232. A cap 233 is placed on the knife carrier being formed in front with a dovetail tongue 234 to fit in the guideway 231 and at its rear face with the other half of the dovetailed guideway 235 to complete a seat for a correspondingly shaped rib 236 on a knife blade 237. Screws 238 secure the cap to the knife arm.

Mounted so as to rotate in the bearing 226 and on the shaft 227 is the hub or sleeve 239 of a guide roll carrying arm 239' in the upper end of which is carried a tap screw 240 which forms a bearing for a shield in the form of a knife guiding and bead protecting roller 241 which is brought to a thin edge 242 flat on one side and curved on the inside to correspond to the shape of the bead. When the knife arm and guide roll arm are assembled the back of the knife lies against the flat inner face of the guide roll. On the guide roll arm is formed a lug or bracket 243 and on the knife carrying arm is formed a second lug or bracket 244. In the guide roll arm is secured a pin 245 which passes through an opening 246 on the knife arm, a nut 247 being threaded on the end of the pin beyond the knife arm bracket. A coil spring 248 surrounds the pin which serves normally to keep the guide roll and knife separated to the limit of the pin. A coil spring 248' may be used to connect the lower ends of the knife carrying arms and tends to keep the knives and rollers separated.

The operation of the device is as follows:

When the tire is ready for trimming, the knives being separated, the frame 220 is rocked into vertical position, the pin 223 moving into the socket 218 under the force of the spring 225. The core is now revolved and the operator pulls the levers 228 toward each other. The guide rollers 241 and the knives 237 move in together being held apart by the springs 248'. The guide rollers strike the lower side of the bead and roll there while a continued pressure on the levers 228 forces the knives inwardly against the force of the springs 248, until they project beyond the periphery of the guide rollers as shown in dotted lines in Fig. 16ª. The combined action of the guide roller and the knife serves as an accurate means of trimming the fabric. The contour of the knife, in combination with the rocking movement, results in the trimming being performed by the curved portion of the knife progressively and the point only of the knife strikes the core when it is moved inwardly, thus protecting the cutting portion of the knife from injury by the core.

*Operation.*

It is believed that the operation of building a tire on the machine will have been made clear, but a brief summary may be beneficial.

The swinging fabric carrying frame having been placed so that the narrow ply is in position the leading end is attached to the core. The action of bringing the fabric in position has also brought the appropriate set of forming rolls in position and the swinging frame is lowered until these forming tools bear on the core. The core is revolved twice if two plies are required under the bead or three or more times, if required. The end of the fabric is cut and the severed end rolled in place. The bead placing rings are now put in position and the bead rolled in place. The fabric carrying frame is now brought around to position, the wider ply which is attached to the core and rolled in place over the bead with the appropriate rollers carried on the frame in position. After the several plies over the bead have been placed the trimmers are brought into position and the carcass trimmed. The core is now removed from the machine and is ready for finishing and curing.

While I have shown and described the machine in great detail, I do not wish to be confined to such details, as the mechanism may be changed without departing from the invention.

Claims:

1. In a tire making machine, the combination of a tire form, means for rotating said form, mountings for a plurality of stock rolls, the tire form and stock roll mountings being relatively movable to selectively bring the rolls and tire form into cooperative relation, and a tension device for each stock roll mounting, the tire form rotating means and each tension device having mutually engageable driving means for driving the tension device when its stock roll is in cooperative relation with the tire form.

2. In a machine for making beaded tire carcasses, the combination of a core, a movable frame, fabric supply rolls for plies of different width and a tension mechanism carried by said frame, and forming mechanism adapted to shape the fabric of different widths both under and over the tire bead.

3. In a machine for making beaded tire carcasses, the combination of a core, a movable frame, fabric supply rolls for different plies carried by said frame, a tension mechanism, a forming mechanism adapted to shape the fabric plies which are under the bead, a second forming mechanism to shape the fabric plies which are over the bead, the said forming mechanisms being adapted to be brought into operative position relative to the core upon movement of the frame.

4. In a machine for making beaded tire carcasses, the combination of a core, a movable frame, fabric supply rolls for different plies carried by said frame, tensioning mechanisms, a forming mechanism adapted to shape the fabric plies which are under the bead, a second forming mechanism to shape the fabric plies which are over the bead, the forming and tensioning mechanisms being adapted to be brought into operative position relative to the core upon movement of the said frame.

5. In a machine for making tire carcasses, the combination of a core, a standard, a movable frame adjacent the core, fabric supply rolls carried on said frame, tensioning rolls on said frame, gearing for actuating said tension rolls, and means for driving said gearing and releasable driving connections between said gearing and said tensioning rolls.

6. In a machine for making tire carcasses, the combination of a standard, a core, a movable frame and fabric supply rolls carried on said frame adjacent the core, tensioning rolls for each said fabric supply roll, a single gearing means for rotating said gearing and means whereby said gearing may be connected to either of said tensioning rolls, when in operative relation to said core.

7. In a machine for making tire carcasses, the combination of a standard, a core and a single reduction gearing carried by the standard, means for rotating said gearing, a movable frame, a fabric supply roll and tensioning rolls carried by the said frame and movable into operative relation to the core, and means to connect said reduction gearing with said tensioning rollers.

8. In a machine for making tire carcasses, the combination of a standard, a core and a single reduction gearing carried by the standard, means for rotating said gearing, a movable frame, fabric supply rolls and tensioning rolls for each said supply roll carried by the said frame and movable into operative relation to the core, and means for connecting said reduction gearing with the tensioning rollers which are in co-operative relation to the core.

9. In a machine for making tire carcasses, the combination of a standard, a core on said standard, a movable frame on said standard, a fabric supply roll, tensioning mechanism and forming mechanism all carried by the said frame and movable into operative relation to said core.

10. In a machine for making tire carcasses, the combination of a core, a movable frame, a plurality of fabric tensioning devices carried by said frame, said frame adapted to be moved to bring one of said tensioning devices into operative position with relation to said core, means for rotating the core, and a driving connection from said rotating means and adapted to be connected with said tensioning device when the latter is brought to operative position.

11. In a machine for making tire carcasses, the combination of a standard, a core on said standard, a movable frame on said standard, two sets of fabric supplies, tensioning mechanisms and forming mechanisms all carried by said frame and movable into operative relation to said core.

12. In a machine for making tire carcasses, the combination of a standard, a core on said standard and a movable frame on said standard, fabric supply, tensioning and delivering mechanisms and forming mechanism, all carried by the said frame, the delivery mechanism being adapted to be brought over said core by movement of said frame.

13. In a machine for making tire carcasses, the combination of a standard, a rotary core on said standard, reduction gearing, means for driving said gearing, a movable frame on said standard; a fabric supply roll, tensioning mechanism and forming mechanism, all carried by the said frame and movable into operative relation to said core and releasable driving connection between said tensioning mechanism and said reduction gearing.

14. In a machine for making tire carcasses, the combination of a standard, a rotary core on said standard, reduction gearing, means for driving said gearing, a movable frame on said standard, two sets of fabric supply, tensioning mechanisms and forming mechanisms, all carried by said frame, and movable into operative relation to said core, and releasable driving connections between said tensioning mechanisms and said reduction gearing.

15. In a machine of the character described, the combination of a core, a set of tools adapted to shape the fabric plies which go under the bead and a second set of tools adapted to shape the fabric plies which go over the bead, a pivoted carrier for each set and means to support each carrier spaced the proper distance from the core.

16. In a machine of the character described, the combination of a core, a set of tools adapted to shape the fabric plies which go under the bead and a second set of tools adapted to shape the fabric plies which go over the bead, a pivoted carrier for each set and means co-operating with the core to position said carriers with relation to said core.

17. In a machine of the character described, the combination of a core, a set of tools adapted to shape the fabric plies which go under the bead and a second set of tools adapted to shape the fabric plies which go over the bead, a pivoted carrier for each set, and a roller on each carrier adapted to rest on the periphery of said core.

18. In a machine of the character described, a core on which the tire carcass is formed, a swinging carrier movable into and out of co-operation of the core, a series of tools mounted on said carrier to operate on the side of the core, certain of said tools being rigid with said carrier, and means for moving the remainder of the tools laterally from the core.

19. In a machine of the character described, a core on which the carcass is formed, a movable carrier, a plurality of tools mounted on said carrier to operate on the side of the core, those tools which operate on the upper side of said core being rigid with said frame, and means for swinging the remainder of said tools away from the sides of the core.

20. In a machine of the character described, a core on which the carcass is formed, a movable carrier, a plurality of tools mounted on said carrier to operate on the side of the core, the first of said tools being rigid with the carrier, means for swinging the remainder of said tools away from the side of the core, and means for increasing the travel of the last of said movable tools over the others.

21. In a machine of the character described, a core on which the carcass is formed, a carrier, a plurality of tools mounted on said carrier, and means for moving said tools away from said core at differing rates of speed.

22. In a machine of the character described, a core on which the carcass is formed, a carrier, a plurality of tools mounted on said carrier, and a unitary means for moving said tools different distances from said core.

23. In combination a core, a tool carrier, a series of tools on said carrier conforming to the shape of the core, a second tool carrier and a series of tools on said carrier conforming to the shape of the core and the bead and means for moving the said carriers selectively into co-operative relation with the core.

24. In combination, a core, a tool carrier, a series of tools on said carrier conforming to the shape of the core, a second tool carrier, a series of tools on said second carrier conforming to the shape of the core and the bead, a fabric delivering mechanism to supply each set of tools and means for moving the carriers and fabric delivery mechanism into co-operative relation with the core.

25. In a machine for making tire carcasses, the combination of a core, a knife for trimming the edge of a carcass on the core, bead protecting means associated with the knife and means to cause relative movement of the knife and the core.

26. In a machine for making tire carcasses, the combination of a core, a knife for trimming the edge of the carcass on the core and a shield adapted to be interpressed between the knife and the carcass during the trimming operation.

27. In a machine for making tire carcasses, the combination of a core, a knife for trimming the edge of the carcass on the core, and a shield on the side of the knife toward the periphery of the core.

28. In a machine for making tire carcasses, the combination of a core, means for trimming said carcass, comprising a pair of knives on opposite sides of said core, means for bringing said knives against the edges of the carcass and guides movable with said knives against the beads.

29. In a machine for making tire carcasses, the combination of a core, means for trimming said carcass, comprising a pair of knives on opposite sides of said core, a roller adjacent each knife, means for moving the knife and the roller against the edge of the carcass and permitting the advance of the knife after the roller contacts the carcass.

30. In a machine for making tire carcasses, the combination of a core, means for trimming said carcass, comprising a knife at the side of the core, a guide roller adjacent the knife, means for moving the knife and guide roller against the carcass and a resilient connection between the knife and guide roller.

31. In a machine for making tire carcasses, the combination of a rotary core, a knife at one side of the core, a guide roller adjacent the knife, an actuating lever connected to said knife and a spring connection between the guide roller and the knife.

32. In a machine for making tire carcasses, the combination of a rotary core, a movable bracket, a knife carried by said bracket, a roller also carried by said bracket, an actuating lever on said knife, and a yielding connection between said guide roller and the knife.

33. In a machine for making tire carcasses, the combination of a rotary core, a movable bracket, a shaft in said bracket, a knife carried by said shaft, means for rocking said shaft, a guide roller supported by said bracket and a yielding connection between the guide roller and the shaft.

34. In a machine for making tire carcasses, the combination of a rotary core, a bracket pivotally mounted adjacent the core, a shaft rotatably mounted in said bracket, a lever at one end of the shaft, an arm at the other end of the shaft, a knife carried in the end of said arm, a second arm loosely mounted on said shaft adjacent the knife arm, a guide roller on said loose arm, and a spring connecting the knife arm and the loose arm.

35. In a machine for making tire carcasses, the combination of a core, a knife for trimming the edge of the carcass and a shield adjacent the knife and adapted to contact with the bead.

36. In a machine for making tire carcasses, the combination of a core, a knife for trimming the edge of the carcass, a shield adjacent the knife and adapted to contact with the bead, and means to force said shield against the bead.

37. In a machine for making tire carcasses, the combination of a rotary core, a knife for trimming the edge of the carcass, a shield adjacent the knife and adapted to contact with the bead, and unitary means to advance the knife during trimming and force the shield against the bead.

38. In a machine for making tire carcasses, the combination of a core, a knife having a curved cutting edge, and means for rocking said knife in a plane transverse to the plane of the core to bring the cutting edge into engagement with the carcass on the core.

39. In a machine for making tire carcasses, the combination of a core, a knife having a curved cutting blade, means for moving said knife toward the tire in an arc whereby the cutting is done progressively along the blade.

40. In a machine for making tire carcasses, the combination of a core, a knife blade, a laterally rocking carrier for the knife blade to bring the edge of the latter into engagement with the carcass.

41. In a machine for making tire carcasses, the combination of a core, a rocking arm, a knife blade rigid with respect to said arm on said arm and means for rocking said arm.

42. In a machine for making tire carcasses, the combination of a core, a laterally rocking arm, a stationary knife blade having a curved cutting edge on said arm and means for rocking said arm.

43. In a machine for making tire carcasses, the combination of a core, a knife blade having a cutting edge adapted to engage the edge of the carcass and a core engaging portion at the terminus of said edge, whereby the cutting portion of said blade is prevented from coming into contact with said core.

44. In a machine for making tire carcasses, the combination of a core, a knife blade having a cutting edge adapted to engage the edge of the carcass and a core engaging portion in the terminus of said cutting edge and rocking means for successively bringing said cutting portion against said carcass and said core engaging portion against the core.

WILLIAM C. STEVENS.